United States Patent [19]

Huber

[11] Patent Number: 5,342,872
[45] Date of Patent: Aug. 30, 1994

[54] PEELABLE AND RECOVERABLE AQUEOUS FILM-FORMING COMPOSITION

[75] Inventor: Mortimer J. Huber, White Bear Lake, Minn.

[73] Assignee: Quality Manufacturing Incorporated, St. Paul, Minn.

[21] Appl. No.: 969,998

[22] Filed: Nov. 2, 1992

[51] Int. Cl.$^5$ .............................................. C08K 5/52
[52] U.S. Cl. ................................... 428/294; 428/292; 428/352; 428/355; 524/55; 524/145
[58] Field of Search ............... 428/343, 355, 352, 221, 428/292, 294; 524/55, 145

[56] References Cited

U.S. PATENT DOCUMENTS

| | | | |
|---|---|---|---|
| 2,680,724 | 1/1952 | Oppenheim | 260/23 |
| 2,800,463 | 3/1957 | Morrison | 525/222 |
| 2,818,169 | 12/1957 | Bergstedt | 524/145 X |
| 3,126,355 | 3/1964 | Birten et al. | 524/53 X |
| 3,256,221 | 6/1966 | Cooper | 524/55 |
| 3,322,703 | 5/1967 | Lindemann | 524/55 X |
| 3,425,968 | 2/1969 | Reiling | 524/55 X |
| 3,442,845 | 5/1969 | Columbus | 524/55 X |
| 3,692,713 | 9/1972 | Columbus | 524/55 X |
| 3,810,783 | 5/1974 | Decatur | 117/122 |
| 4,126,144 | 11/1978 | Duarte | 132/73 |
| 4,251,400 | 2/1981 | Columbus | 524/55 X |
| 4,396,739 | 8/1983 | Sirota et al. | 524/55 X |
| 4,440,884 | 4/1984 | Jannusch | 524/25 X |
| 4,634,727 | 1/1987 | Kamikaseda et al. | 524/145 |
| 4,781,781 | 11/1988 | Hallworth | 524/55 X |
| 4,792,464 | 12/1988 | Martenson | 427/156 |
| 5,010,131 | 4/1991 | Wagner | 524/457 |
| 5,116,676 | 5/1992 | Winslow | 428/343 |

OTHER PUBLICATIONS

Grip–Mask Strippable Coating Product Data Sheet, pp. 57–58.
"Product Review", *Sign Builder Illustrated,* pp. 32–33 (Sep.–Oct. 1992).

*Primary Examiner*—Judy M. Reddick
*Attorney, Agent, or Firm*—Merchant, Gould, Smith, Edell, Welter & Schmidt

[57] ABSTRACT

Recoverable, peelable masking films prepared from an aqueous emulsion of polyvinyl acetate resins are disclosed. The aqueous composition is an admixture about 70 to 80 wt-% an aqueous vehicle; about 20 to 30 wt-% of a polyvinyl acetate film-forming resin; about 0.1 to 5 wt-% of a plasticizer; about 0.1 to 5 wt-% of a water soluble polysaccharide gum; less than about 1 wt-% of an emulsifiable thickening agent; about 0.01 to 1 wt-% of a release agent to render a film formed from the aqueous composition peelable from a substrate; and about 0.1 to 1 wt-% of a defoaming agent. The composition can then be dried to form a peelable film consisting essentially of a single layer comprising about 70 to 99 wt-% of polyvinyl acetate resin; about 0.1 to 15 wt-% a water soluble polysaccharide gum; about 0.1 to 15 wt-% of a emulsifiable thickening agent; and about 0.01 to 5 wt-% of a release agent to render a film formed from an aqueous composition peelable from a substrate. The aqueous, film-forming composition is reformable by adding a sufficient quantity of water to the dried film.

In addition, the composition can be formed into a pressure sensitive masking film consisting essentially of a single layer of the film. The film can be formed into rolls of tape or stencil sheets. Also, the film can be packaged for shipment and reformulated by a customer or user by reconstitution with an aqueous vehicle.

4 Claims, No Drawings

PEELABLE AND RECOVERABLE AQUEOUS FILM-FORMING COMPOSITION

FIELD OF THE INVENTION

This invention relates generally to aqueous dispersions of polymeric resins, and in particular to aqueous dispersions of polyvinyl acetate resins which are useful in forming peelable, protective films on glassy surfaces such as metal, glass, plastic, paint, etc.

BACKGROUND OF THE INVENTION

Peelable, protective films have a number of uses in industry. These uses include protecting finished surfaces from damage during manufacture, shipping, and handling as well as masking certain areas of a surface from exposure during spraying operations including painting. The coatings are generally cohesive films which have moderate adhesion to the substrate and which can be easily removed from the surface simply by lifting one portion from the surface and peeling the film away.

In masking applications, the films are generally relatively clear to allow the mask preparer to discern patterns projected onto and through the film. In addition, the films are relatively easily cut with sharp knives. This is to allow the mask maker to apply the film to a surface, project a pattern through a transparent or translucent substrate, and to cut through the film mask to selectively expose areas of the substrate to permit the painting of exposed areas of the substrate.

The films are generally liquid carrier based materials from which the carrier must be volatilized during the formation of the film on the surface. Early aqueous films are represented by Oppenheim, U.S. Pat. No. 2,680,724, which discloses particular temporary protective coatings based upon a plasticized polyvinyl butyryl resin. However, the aqueous composition requires processing at elevated temperatures, well in excess of 100° C. This material has apparently been marketed for a number of years under the trademark SPRAYLAT. However, once the material has been used and stripped from a surface, the material does not appear to be recoverable, and the processor must dispose of a great deal of waste. It is well known that current manufacturing conditions are demanding a reduction in such process waste, and therefore, a recoverable masking or protective film must be found.

Another peelable or strippable film is disclosed in Martenson, U.S. Pat. No, 4,792,464. This film is a temporary, readily strippable, protective film for metal surfaces which incorporates corrosion inhibitors and is impervious to gases such as oxygen and water vapor. The film is applied as an aqueous composition comprising (1) a terpolymer of polyvinyl butyryl, polyvinyl alcohol, and polyvinyl acetate; (2) a hydroxyalkyl cellulose ester; (3) a corrosion inhibitor dispersed in a plasticizer for the polyvinyl butyryl; and (4) morpholine as a leveling agent. This composition is apparently designed simply as temporary, protective coating for metals, and the reference apparently does not contemplate use of the film as a painting mask. In any event, the reference fails to recognize the waste problem of requiring the recovery and reuse of the film.

A third type of removable, protective film composition is disclosed in Wagner, U.S. Pat. No. 5,010,131. This film is disclosed for use in paint spray booths to protect the booth and equipment therein from paint overspray. The film-forming aqueous solution comprises a film-former, a filler, an alkaline source, and a blowing agent. Film-formers disclosed include vinyl acetate copolymer emulsions, sugar, soap, certain organic salts, and polyvinyl alcohol. The film is sprayed on a surface and allowed to dry. After the film has become contaminated with paint overspray, it is removed by action of a pressurized spray of hot water (at least 190° F.). The action of the hot water activates the blowing agent which helps to release the film from substrates. Thus, the film does not appear to be peelable. Further, the removal process results in the presence of potentially hazardous particulate waste material in process water. This creates significant waste removal problems for the practitioner. In addition, there is no disclosure of recovery or reuse of the protective film material.

In view of the above-described art, it is readily apparent that a new and useful aqueous coating composition is needed which can form protective films and masks which can be easily recovered and reformulated into an aqueous coating composition. Further, versatile masks and tapes are needed which are self-adhesive and can be prepared from such aqueous coating compositions.

SUMMARY OF THE INVENTION

A new, aqueous coating composition has been developed which is useful in forming protective films and masks which can be easily recovered and reformulated into an aqueous coating composition. In addition, a solid, composition has been developed which can form such an aqueous film-forming composition by combining the solid material with an aqueous vehicle. Further, a method of forming a recoverable protective film or mask on a surface, as well as method for the recovery of such used films or masks are disclosed. Finally, a peelable PSA masking film which is very flexible and supple and as useful to form smooth curves having complex radii on complex surfaces.

The aqueous coating composition of the invention includes about 70 to 80 wt-% aqueous vehicle, about 20 to 30 wt-% of a polyvinyl acetate resin, about 0.1 to 5 wt-% of a plasticizer, 0.1 to 5 wt-% of a water soluble polysaccharide gum, less than about 1 wt-% of a water emulsifiable thickening agent to increase the viscosity of the composition and to impart cohesiveness to the composition, about 0.01 to 1 wt-% of a release agent to render the dried film peelable from a substrate and about 0.1 to 1 wt-% of a defoaming agent. The composition can be applied to a substrate and dries to form a peelable, protective film or mask. The film can remain on the surface to protect the substrate during further manufacture, shipping and/or other handling, or it can be cut and selectively removed to act as a mask for paint spraying operations. After use, the film can be removed from the substrate, and recovered to reformulate the aqueous coating composition.

Protective tapes or masks can be prepared which are pressure sensitive. Tapes may have longitudinal reinforcing fibers and may be provided in roll form with or without release liners. Such tapes can be produced in width ranging from about ¼" to greater than one inch. Stencils may be provided—cut from a preformed film or screen printed onto a release liner.

The invention also relates to a process of forming a peelable film on a surface by combining, at a temperature of less than about 100° C. and at a pH of about 4 to 7, water with the above solid, composition to form an aqueous, film-forming composition and applying that composition to a surface. The aqueous composition dries to form a peelable film on the surface which film is recoverable to reformulate the aqueous composition.

Finally, the invention additionally relates to a process of recovering the above-described applied and used peelable film by combining the film with water at a temperature of less than about 100° C. and at a pH of about 4 to 7. In this manner, an aqueous, film-forming composition is reformulated.

DETAILED DESCRIPTION OF THE INVENTION

The aqueous film-forming composition of the invention comprises water, a polyvinyl acetate resin, thickening components including a water-soluble polysaccharide gum and a water emulsifiable thickening agent, and a release agent. In addition, the composition may include stabilizers, pigments, fillers, and defoaming agents

Aqueous Vehicle

The aqueous vehicle of the present invention provides for the flowability of the composition and allows the film to be formed on a substrate. The vehicle may be essentially all water or it may include a portion of a miscible organic co-solvent. Such co-solvents may include lower alcohols such as methanol, ethanol, n-propanol, n-butanol, etc. Preferably the co-solvent (if any) is methanol or ethanol. The use of a co-solvent results in a quicker drying formulation.

The co-solvent may be present at a level up to about 40% of the total composition in order to keep the flash point of the composition above room temperature. More preferably, the co-solvent is present at less than about five percent. In one embodiment, there is minimal (1–2%) organic co-solvent. This reduces particularly preferred bubbles in the films produced and provides a less hazardous work environment.

Polyvinyl Acetate Resin

The polyvinyl acetate resin of the present invention provides the majority of the film-forming properties of the aqueous composition.

The polyvinyl acetate resin is preferably combined with other components such as tackifiers and plasticizers as an aqueous emulsion. More preferably, the polyvinyl acetate emulsion is formulated as an adhesive emulsion comprising minor amounts of polyvinyl alcohol, as well as synthetic resin tackifiers and plasticizers. This emulsion preferably includes about 50 wt-% solids, more preferably about 48 to 55 wt-%, and most preferably about 52 wt-%. The emulsion may also include various other components such as surfactants and stabilizers to increase the storage life of the emulsion. In addition, the polyvinyl acetate emulsion may include an effective amount of freeze-thaw stabilizers to stabilize the emulsion through numerous freeze-thaw cycles which may otherwise destroy the emulsion. For example, XR-5832M, a polyvinyl acetate emulsion adhesive available from H. B. Fuller Company is useful in the preparation of the aqueous film-forming composition of the invention.

Plasticizer

The plasticizer of the aqueous film-forming mixture is selected to render the resulting film pliable and to allow a dried film to "wet" a glassy substrate for adhesion. In addition, the plasticizer may act as a humectant to ensure that the dried film maintains a minor level of moisture. The plasticizers may be any water soluble or water dispersible composition which is compatible with polyvinyl acetate and imparts flexibility to the dried film either through true plasticization or as a humectant. Representative examples of useful plasticizers and humectants include glycerine, propylene glycol, ethylene glycol, glycol derivatives, sorbitol, sucrose, triacetin, etc. Preferred plasticizers are the humectants such as glycerine, propylene and ethylene glycol, and sorbitol. More preferred is glycerine. The plasticizers is preferably incorporated into the aqueous mixture at about 0.1 to 5 wt-%, more preferably about 0.5 to 1.5 wt-%, and most preferably about 1 wt-%.

Thickening Agent

The thickening agents employed in the aqueous film-forming composition may be useful to increase the cohesion of the liquid composition during the drying process, as a suspending agent or protective colloid to improve the stability of the aqueous emulsion, and to improve the film-forming capabilities of the composition. A representative, non-limiting list of useful water emulsifiable thickening agents includes carboxyl alkyl polymers such as carboxyvinyl polymers or carboxyl polymethylene; and starches such as potato starch. Additionally thickeners including water soluble polysaccharide materials such as xanthan gum are also useful in the composition of the present invention. To obtain multiple benefits, a combination of (1) a carboxyl vinyl polymer or potato starch and (2) xanthan gum is used as a thickening agent.

Release Agent

The release agent or abherent of the aqueous film-forming composition is selected to render the film formed from the aqueous composition peelable from a substrate. Preferably, the release agent works to render the film peelable from a substrate such as metal, glass, or plastic or another polymeric structure or coating. A representative, non-limiting list of such release agents or abherents includes lecithin, solid or liquid polyoxyethylene glycols or polyethylene glycols, lower molecular weight metal soaps such as potassium or sodium salts of fatty acids, and ethylene oxide-propylene oxide nonionic surfactants such as PLURONICS TM, available from BASF. Preferably, the release agent is a liquid polyethylene glycol or lecithin, and most preferably, the release agent is lecithin.

Optional Components

The aqueous film-forming composition optionally includes stabilizers, pigments, fillers, and defoaming agents. The stabilizers may include both stabilizers for the emulsion (e.g. surfactants) as well as stabilizers to render the aqueous composition freeze-thaw stable (e.g. alcohols).

In addition, pigments, dyes, and fillers may be incorporated into those compositions which do not require light-transparent properties. These pigments and dyes may provide identifying characteristics to the aqueous composition, the peelable, protective film, or both. The fillers may increase some of the films properties such as toughness, strength, etc.

The defoaming agents may be helpful in the processing of the aqueous composition to reduce foam created during the mixing of the components to form the composition. In addition, the defoaming agents are helpful to reduce bubbles and resulting pinholes in a protective film or mask formed by spraying or brushing the aqueous composition on a substrate. A representative, non-limiting list of useful defoaming agents includes higher alcohols, sulfonated oils, organic phosphates, silicone fluids, and siloxanes such as dimethylpolysiloxane. Preferably, the defoaming agent is a silicone fluid or dimethylpolysiloxane.

Process of Use

In a preferred process of manufacture, the aqueous composition is prepared by charging a mixing vessel with about one-third of the free water at about 10° to 15° C. necessary to make up the desired amount of aqueous composition. The mixing vessel preferably has both means for agitation and shear mixing of the components charged into the vessel. Such action is preferably provided by use of mixing blades within the vessel and an external centrifugal pump with means to remove liquids from and return liquids to the vessel. If a defoaming agent is to be incorporated into the composition, it is added next to keep foam generated during the process to a minimum. The release agent is added next, and the dry ingredients such as the thickening agents are added. The mixing continues until a relatively uniform consistency is achieved in the mixture, and the balance of the water is added. Finally, an aqueous emulsion of the polyvinyl acetate is added to the mixing vessel, and the agitation of the vessel continues for about 0.1 to 1 hours after the addition ceases. The resulting aqueous composition has a pudding-like consistency, is stiff enough to hold lines on a surface and "clingy" enough to suspend a large dab from a finger without dripping.

The aqueous composition thus formed may then be further processed, used, or delivered to containers for storage or distribution. The composition may be applied by spraying, roll coating, etc. onto a substrate and allowed to dry. After drying, the composition may be left in place as a protective coating, e.g., for white wall tires, automotive paint finishes, etc., or it may be cut to form a stencil, e.g. in sign preparation, etc.

In order to prepare the solid composition which may later be combined with an appropriate amount of water to provide the aqueous film-forming composition, the aqueous composition prepared as above is formed into a thin sheet, less than about 5 mm, and dried. The dried sheet can then be shredded to form the solid, particulate composition, or it can be shipped and stored as sheets. The sheets can be reconstituted as described below.

Process of Recycle

After the peelable mask has been used to protect a surface, the material may be stripped from the substrate surface and combined with water to reformulate an aqueous film-forming composition. The product may be recycled if it has been painted or if it has been simply used as a surface protective coating. If the film has been painted, the paint must be separated from the film-forming resin prior to or concurrently with reformulating the aqueous film-forming composition.

In recycling a painted film, the painted film may be combined with water at a temperature of less than about 100° C. and at a pH of about 4 to 7. The aqueous composition may be agitated for a period of time necessary to effectively dissolve the film. The paint which was on the masking film generally remains as paint chips and/or flecks in the aqueous solution of the film-forming material. The paint may then be separated from the aqueous film-forming composition by filtration, settling, or other means well known in the separator art. If the resulting aqueous composition has a viscosity which is below that normally used in the application of the composition to form the masking film, additional film-forming components can be added to the aqueous composition in the proportions required for the original film-forming composition procedure. This can be done until the resulting composition has a pudding-like consistency.

In recycling an unpainted film, the film may be combined with water at a temperature of less than about 100° C. and at a pH of about 4 to 7. The aqueous composition may be agitated for a period of time necessary to effectively dissolve the film. The film to be recycled and the water are generally combined in a ratio of about 2 to 2.5:1. Some additional thinning may be required in low humidity conditions. This results in a composition essentially the same as originally formulated having a solids content of about 18 to 24 wt-%.

The aqueous mixture can also be prepared from clean film or packaged sheets. In this manner, the film can be recycled or the material can be prepared in sheet form and shipped to a customer. Shipping the product in a dry form tremendously decreases shipping costs. To reconstitute the sheets, 30 parts by weight of the film or sheets can be placed in a container with 70 parts by weight of an aqueous vehicle comprising water or a water and alcohol mixture. The sheets are allowed to rest in the aqueous vehicle until the liquid becomes gummy. Then the mixture is agitated until attaining a uniform consistency. This reconstitution procedure results in a mixture having about 30 wt-% solids.

The aqueous mixture can be formed into pressure sensitive adhesive masking film tapes or stencils. The masking films consist essentially of a single layer which adheres to glassy surfaces. The single layer comprises about 70 to 99 wt-% of a polyvinyl acetate resin, about 0.1 to 15 wt-% of a water soluble polysaccharide gum, about 0.1 to 15 wt-% of an emulsifiable thickening agent and about 0.01 to 5 wt-% of a release agent to render a film formed from an aqueous composition peelable from a substrate. The resulting film is capable of deforming, stretching and being formed into smooth curves having compound radii in a single plane as well as smooth curves on surfaces having compound curves. This can be done without wrinkling along either edge of the film tape. This is a substantial improvement over masking tapes currently available in the market place such as FINELINE, SCOTCH brand 218 MQA tape available from 3M. While this tape is strong and adhesive, it is generally too inelastic to form smooth curves along both edges of the tape when formed into a planar curve.

The present masking film can be formed into rolls of tape varying in width from about one-fourth inch to over an inch. Greater widths tend to be more difficult to form into smooth planar curves while lesser widths tend to be too weak and susceptible to breakage. The adhesive strength of the film can also vary. Increasing the relative proportion of plasticizer increases the initial tack of the film, while increasing the release agent or thickener tends to decrease the initial tack of the film. In addition, the tape can be sprayed with a light mist of water to increase the tack prior to applying to a surface to be protected.

The film tape can be prepared by coating a film onto a conveyor belt having a smooth, glassy surface, heating the film to quickly dry it, slitting the resulting film into tape strips and rolling the strips onto a core. In addition, the tape can be rolled up with a release liner to prevent blocking (the tendency of the film to stick to itself) during storage.

The masking film can also be formed as a patterned stencil. The stencil can either be cut, washed or otherwise prepared from a preformed film on a backing sheet, or it can be formed from the aqueous, film-forming mixture itself. In forming a stencil from a preformed film, the pattern can be die cut, manually cut with a knife, or otherwise prepared. In forming a stencil from the aqueous mixture, it can be painted on a backing sheet, screen printed or otherwise patterned prior to drying the mixture to form a film. The backing sheet should be release lined, e.g. waxed paper, silicone-sprayed kraft paper, MYLAR film, etc. Again, the pressure sensitive adhesive properties such as tack can be modified by formulation as described above, or the stencil can be activated by a fine water mist prior to application.

EXAMPLES

The following examples are provided to promote an understanding of the invention and contain a best mode.

Comparative Example A

The following components were used to prepare a protective film according to the prior art:

| Component | Parts by Weight |
| --- | --- |
| Water | 58.2 |
| COLLOID 912 defoamer (Rhone-Poulanc) | 0.5 |
| Xanthan gum | 0.7 |
| Lecithin | 0.8 |
| METHOCEL E15LV (Dow Chemical) cellulose derivative | 1.0 |
| METHOCEL E4M (Dow Chemical) cellulose derivative | 0.5 |
| Polyvinyl acetate emulsion | 38.8 |
| Dye | 0.01 |

One-half of the water (tap water at about 60° F.) was charged into a mixing vessel, and the defoamer was added. Agitation was commenced with mixing blades and a centrifugal recirculation pump and continued until the mixture was smooth. Agitation continued, and the lecithin was then added followed by the METHOCEL and xanthan gum powders. The remaining water was added at a temperature of about 160° F. Polyvinyl acetate emulsion having 54% solids and a viscosity of about 50,000 cP was added under agitation, and the agitation continued until the mixture was smooth.

The resulting mixture was difficult to use and had a solids content of about 20 wt-%. The mixture was very thick and streamed out of a spray nozzle. Where thinned, the liquid sagged on a vertical surface before drying to form a film. A dried film did not have significant pressure sensitive qualities.

Example 1

The following components were used to prepare a protective film according to the present invention:

| Component | Grams |
| --- | --- |
| Polyvinyl acetate emulsion (H. B. Fuller XR5832M) | 472 |
| Water | 500 |
| COLLOID 685 defoamer (Rhone-Poulanc) | 6 |
| COLLOID 912 defoamer (Rhone-Poulanc) | 0.8 |
| Xanthan gum | 6 |
| CARBOPOL 675 (Union Carbide) carboxyvinyl polymer | 1.2 |
| Glycerine | 8 |
| Lecithin | 0.2 |
| JET DRY surfactant | 5 |

One-third of the water (tap water at about 55° F.) was charged into a mixing vessel. Agitation was commenced with mixing blades and a centrifugal recirculation pump and continued as a mixture of the glycerine, lecithin and JET DRY was added. A mixture of the defoamers, xanthan gum and CARBOPOL was added to the mixer under agitation. The remaining water was added at a temperature of about 100° F. to the mixer, and agitation continued until the mixture was smooth, and the polyvinyl acetate emulsion having about 55 wt-% solids and a viscosity of about 10,000 cP was added. Agitation continued until the mixture was smooth.

The resulting mixture had a pudding-like consistency and had a solids content of about 25 wt-%. A relatively thin film of the mixture was sprayed onto a substrate to form a masking film. A dried film had sufficient pressure sensitive qualities to adhere the film to a glassy substrate to provide protection during subsequent spray painting.

Example 2

The following components were used to prepare a quick dry protective film according to the present invention:

| Component | Grams |
| --- | --- |
| Polyvinyl acetate emulsion (Fuller XR-5832M) | 650 |
| Water | 320 |
| COLLOID 685 defoamer (Rhone-Poulanc) | 6 |
| COLLOID 912 defoamer (Rhone-Poulanc) | 0.8 |
| Xanthan gum | 4 |
| CARBOPOL 675 (Union Carbide) | 0.8 |
| Glycerine | 8 |
| Lecithin | 0.3 |
| JET DRY surfactant | 5 |

The procedure of Example 1 was repeated in preparing the aqueous mixture. The resulting mixture had a pudding-like consistency and had a solids content of about 35 wt-%. A relatively thin film of the mixture was sprayed onto a substrate to form a masking film. A dried film had sufficient pressure sensitive qualities to adhere the film to a glassy substrate to provide protection during subsequent spray-painting operations.

Example 3

The following components were used to prepare a protective film according to the present invention:

| Component | Grams |
| --- | --- |
| Polyvinyl acetate emulsion (Fuller XR-5832M) | 444 |
| Water | 526 |
| COLLOID 685 defoamer (Rhone-Poulanc) | 6 |
| COLLOID 912 defoamer (Rhone-Poulanc) | 0.8 |
| Xanthan gum | 8 |
| CARBOPOL 675 (Union Carbide) | 1.2 |
| Glycerine | 4.4 |
| Lecithin | 0.2 |

| Component | Grams |
| --- | --- |
| JET DRY surfactant | 5 |
| Methanol | 10 |

The procedure of Example 1 was repeated in preparing the aqueous mixture, and the methanol was added after the polyvinyl emulsion had been added and the mixture was smooth. The resulting mixture had a pudding-like consistency and had a solids content of about 35 wt-%. A relatively thin film of the mixture was sprayed onto a substrate to form a masking film. A dried film did not had sufficient pressure sensitive qualities to adhere the film to a glassy substrate to provide protection during spraying operations.

Example 4

Although the present invention has been described with reference to the above particular discussion and examples, it should be understood that those skilled in the art may make many other modifications without departing from the spirit and scope of the invention as defined by the appended claims.

What is claimed is:

1. A peelable, self-adhesive, protective tape consisting essentially of a single tape layer comprising:
    (a) about 70 to 99 wt-% of a polyvinyl acetate resin;
    (b) about 0.1 to 15 wt-% of a water soluble polysaccharide gum;
    (c) about 0.1 to 15 wt-% of a carboxyvinyl polymer; and
    (d) about 0.01 to 5 wt-% of a release agent to render a film formed from an aqueous composition peelable from a substrate;
wherein the tape adheres to smooth, glassy surfaces and is deformable and capable of forming smooth curves having compound radii on surfaces having compound curves.

2. The tape of claim 1 wherein the water soluble polysaccharide gum is xanthan gum.

3. The tape of claim 1 wherein the release agent comprises lecithin.

4. The tape of claim 1 wherein the tape layer further comprises a reinforcing fiber running longitudinally along the tape.

* * * * *